United States Patent
Kanomata et al.

(10) Patent No.: US 9,796,850 B2
(45) Date of Patent: *Oct. 24, 2017

(54) POLYARYLENE SULFIDE RESIN COMPOSITION, MANUFACTURING METHOD OF RESIN COMPOSITION AND MOLDED PRODUCT OF RESIN COMPOSITION

(71) Applicant: Toray Industries, Inc., Tokyo (JP)

(72) Inventors: Akinori Kanomata, Nagoya (JP); Shunsuke Horiuchi, Nagoya (JP); Shu Kaiho, Nagoya (JP); Koji Yamauchi, Nagoya (JP)

(73) Assignee: Toray Industries, Inc. (JP)

( * ) Notice: Subject to any disclaimer, the term of this patent is extended or adjusted under 35 U.S.C. 154(b) by 319 days.

This patent is subject to a terminal disclaimer.

(21) Appl. No.: 14/396,857

(22) PCT Filed: Apr. 26, 2013

(86) PCT No.: PCT/JP2013/002855
§ 371 (c)(1),
(2) Date: Oct. 24, 2014

(87) PCT Pub. No.: WO2013/161321
PCT Pub. Date: Oct. 31, 2013

(65) Prior Publication Data
US 2015/0126668 A1    May 7, 2015

(30) Foreign Application Priority Data
Apr. 27, 2012  (JP) .................. 2012-102937

(51) Int. Cl.
| | |
|---|---|
| C08L 81/04 | (2006.01) |
| C08J 3/00 | (2006.01) |
| C08K 5/5435 | (2006.01) |
| C08G 75/02 | (2016.01) |
| C08L 81/02 | (2006.01) |

(52) U.S. Cl.
CPC .............. *C08L 81/04* (2013.01); *C08G 75/02* (2013.01); *C08J 3/005* (2013.01); *C08K 5/5435* (2013.01); *C08L 81/02* (2013.01); *C08J 2381/04* (2013.01); *C08J 2481/04* (2013.01); *C08L 2201/02* (2013.01); *C08L 2203/202* (2013.01); *C08L 2205/025* (2013.01)

(58) Field of Classification Search
CPC ....... C08G 75/02; C08J 3/005; C08J 2381/04; C08J 2481/04; C08K 5/5435; C08L 81/02; C08L 81/04; C08L 2201/02; C08L 2203/202; C08L 2205/025
USPC ................................... 524/500, 450
See application file for complete search history.

(56) References Cited

U.S. PATENT DOCUMENTS

| | | | |
|---|---|---|---|
| 3,322,834 A | 5/1967 | Hill, Jr. et al. | |
| 3,354,129 A | 11/1967 | Edmonds, Jr. et al. | |
| 5,488,084 A | 1/1996 | Kadoi et al. | |
| 5,723,542 A | 3/1998 | Hwang et al. | |
| 7,750,111 B2 * | 7/2010 | Horiuchi ............ | C08G 75/0277 524/609 |
| 2009/0234068 A1 | 9/2009 | Horiuchi et al. | |

FOREIGN PATENT DOCUMENTS

| | | |
|---|---|---|
| EP | 0 401 502 | 12/1990 |
| EP | 0 445 588 | 9/1991 |
| EP | 1 057 871 | 12/2000 |
| JP | 45-3368 | 2/1970 |
| JP | 2-283763 | 11/1990 |
| JP | 04-198267 | 7/1992 |
| JP | 4-220462 | 8/1992 |
| JP | 05-025388 | 2/1993 |
| JP | 05025388 | * 2/1993 |
| JP | 05-105757 | 4/1993 |
| JP | 05-163349 | 6/1993 |
| JP | 05-301962 | 11/1993 |
| JP | 07-102064 | 4/1995 |
| JP | 08-085759 | 4/1996 |
| JP | 8-176440 | 7/1996 |
| JP | 09-272801 | 10/1997 |
| JP | 11-286548 | 10/1999 |
| JP | 11286548 | * 10/1999 |
| JP | 2001-172500 | 6/2001 |
| JP | 2007-077264 | 3/2007 |
| JP | 2007-231255 | 9/2007 |
| JP | 2008-222889 | 9/2008 |
| JP | 2008-231141 | 10/2008 |
| WO | 2007/034800 | 3/2007 |

OTHER PUBLICATIONS

Zimmerman, et al., "Polymerization of poly(p-phenylene sulfide) from a cyclic precursor," Polymer, vol. 37, No. 14, 1996, pp. 3111-3116.

* cited by examiner

*Primary Examiner* — Ling Choi
*Assistant Examiner* — Chun-Cheng Wang
(74) *Attorney, Agent, or Firm* — DLA Piper LLP (US)

(57) ABSTRACT

A reactive functional group-containing polyarylene sulfide resin composition having a narrow polydispersity and a low gas generation amount is manufactured by mixing a polyarylene sulfide resin (a) and a polyarylene sulfide resin (b), wherein the polyarylene sulfide (a) has a weight reduction ratio ΔWr of not higher than 0.18% under heating and an increase rate of melt viscosity of less than 1.05 times by addition of a reactive compound (c) having a reactive group relative to melt viscosity prior to addition of the reactive compound (c), and the polyarylene sulfide (b) has the weight reduction ratio ΔWr of not higher than 0.18% under heating and the increase rate of melt viscosity of not less than 1.05 times by addition of the reactive compound (c) having the reactive group relative to melt viscosity prior to addition of the reactive compound (c).

10 Claims, No Drawings

POLYARYLENE SULFIDE RESIN COMPOSITION, MANUFACTURING METHOD OF RESIN COMPOSITION AND MOLDED PRODUCT OF RESIN COMPOSITION

TECHNICAL FIELD

This disclosure relates to a polyarylene sulfide resin composition including a reactive functional group and having a low gas generation amount and a narrow molecular weight distribution, as well as to a manufacturing method of the same and a molded product of the same.

BACKGROUND

Polyarylene sulfides (hereinafter may be abbreviated as PAS) as typified by polyphenylene sulfides (hereinafter may be abbreviated as PPS) are resins having favorable properties as engineering plastics such as excellent heat resistance, barrier property, chemical resistance, electric insulation, moist heat resistance and flame resistance. The polyarylene sulfides are moldable by injection molding or extrusion molding to various molded components, films and sheets and fibers and are used in a wide range of fields needing the heat resistance and the chemical resistance, such as various electric and electronic components, mechanical components and automobile components.

A specific manufacturing method of this polyarylene sulfide has been proposed to use the reaction of an alkali metal sulfide such as sodium sulfide with a polyhalogenated aromatic compound such as p-dichlorobenzene in an organic amide solvent such as N-methyl-2-pyrrolidone. That method is widely used as the industrial manufacturing method of polyarylene sulfide. That manufacturing method, however, has some problems, i.e., need for the reaction under the high temperature, high pressure and strongly alkaline conditions, need for an expensive high boiling-point polar solvent such as N-methylpyrrolidone, energy-intensive with high cost for recovery of the solvent and need for enormous processing cost.

Additionally, the polyarylene sulfide manufactured by that method has a low molecular weight and a very wide distribution of molecular weight as a whole and is not desirable in application of the molding process. More specifically, the polyarylene sulfide is a polymer having a very high polydispersity of 5.0 to 20 expressed by (weight average molecular weight Mw/number average molecular weight Mn). Accordingly, application of the polyarylene sulfide obtained by the above method to the molding process causes some problems, for example, insufficient mechanical properties, a high gas generation amount under heating and a large amount of eluted component during exposure to a solvent. In manufacturing the polyarylene sulfide by the above manufacturing method, a process of increasing the molecular weight by, for example, thermal oxidative cross-linking in the air is needed. This complicates the process and lowers the productivity (for example, JP S45-3368B). The process of increasing the molecular weight causes a partial component of the polyarylene sulfide having the wide distribution of molecular weight to have an excessively high molecular weight. In that case, the high molecular weight component leads to deterioration of the flowability and the moldability, whereas the low molecular weight component leads to deterioration of, for example, the mechanical strength and the chemical resistance.

A manufacturing method of polyarylene sulfide by heating a cyclic polyarylene sulfide has been disclosed as another manufacturing method of polyarylene sulfide. That method is expected to obtain a polyarylene sulfide having a high molecular weight, a narrow distribution of molecular weight and a little weight loss under heating (for example, WO 2007/034800 and *Polymer*, Vol. 37, No. 14, 1996 (pages 3111 to 3116)). The polyarylene sulfide manufactured by that method is, however, expected to have no terminal structure or even if any, only a very small amount of terminal structure obtained by impurities or side reactions in the course of polymerization. Accordingly, that method gives a polymer having uncertainty in the presence or the absence of the terminal structure and the amount of the terminal structure. The polyarylene sulfide without the terminal structure or with only a very small amount of the terminal structure is expected to have such problems as poor compatibility with a filling material such as filler, another thermoplastic resin and a thermosetting resin and insufficient mechanical properties.

As the above manufacturing method of the polyarylene sulfide by heating the cyclic polyarylene sulfide, a manufacturing method of a polyarylene sulfide resin composition having a low weight reduction ratio $\Delta$Wr of not higher than 0.18% under heating has been disclosed, which mixes an olefin copolymer containing an epoxy group with an olefin copolymer without an epoxy group. The polyarylene sulfide obtained by that method, however, has the low gas generation amount and the improved molding processability but provides only insufficient compatibility between PAS resin and the epoxy group-containing olefin resin and accordingly does not give the practically satisfying level of toughness (for example, JP 2008-222889A).

Another manufacturing method of a similar polyarylene sulfide resin composition having the low weight reduction ratio $\Delta$Wr of not higher than 0.18% under heating has been disclosed, which mixes a polyphenylene sulfide with fibrous and non-fibrous filling materials. The resin composition obtained by that method, however, has the low gas generation amount but insufficiently improved filler adhesiveness and does not give the practically satisfying level of mechanical properties (for example, JP 2008-231141 A).

A number of methods of introducing a functional group to polyarylene sulfide including a method that does not use the above cyclic polyarylene sulfide have been known as the method of providing polyarylene sulfide with the reactivity. One exemplary method melt kneads a polyarylene sulfide obtained by a conventional reaction with a compound having a functional group such as an alkali metal salt of an organic compound or maleic anhydride (for example, JP H11-286548A and JP H02-283763A).

Another exemplary method introduces a functional group to the polymer main chain by copolymerization of a functional group-containing polyhalogenated compound in the course of polymerization of the polyarylene sulfide (for example, JP H07-102064A).

Those methods, however, have the problem of complicated operations to introduce a certain amount of the functional group to achieve the sufficient effects. The methods described in the above JP H11-286548A, JP H02-283763A and JP H07-102064A use the conventional PAS and accordingly do not solve the problems of the conventional PAS, e.g., the high gas generation amount and the wide distribution of molecular weight.

Another disclosed method of manufacturing polyarylene sulfide polymerizes a cyclic arylene sulfide oligomer by ring-opening polymerization under heating in the presence of an ionic ring-opening polymerization catalyst. That method is expected to obtain a polyarylene sulfide containing a functional group and having a narrow distribution of molecular weight. That method, however, uses an alkali metal sulfur compound, such as sodium salt of thiophenol, as the ring-opening polymerization catalyst for synthesis of polyarylene sulfide and accordingly has a problem that a significant amount of the alkali metal remains in the resulting polyarylene sulfide. More specifically, increasing the amount of the ring-opening polymerization catalyst used to increase the amount of the functional group for the purpose of providing the reactivity causes problems, for example, increasing the amount of the alkali metal remaining in the polyarylene sulfide and decreasing the molecular weight of the resulting polyarylene sulfide. That reduces the reliability in applications that need the electrical insulating properties and limits expansion to applications that need the sufficient mechanical properties. Additionally, the above method of ring-opening polymerization also achieves only an insufficient decrease in gas generation amount (for example, JP H05-301962A, JP H05-163349A and JP H05-105757A).

It could therefore be helpful to provide an industrially useful polyarylene sulfide resin composition that includes a reactive functional group and has low gas generation and a narrow distribution of molecular weight.

SUMMARY

We thus provide:

1. A polyarylene sulfide resin composition comprising a polyarylene sulfide (a) and a polyarylene sulfide (b), wherein a content of the polyarylene sulfide (a) is 95 to 5% by weight relative to a total content of the polyarylene sulfide (a) and the polyarylene sulfide (b) equal to 100% by weight, the polyarylene sulfide (a) has a weight reduction ratio $\Delta Wr$ of not higher than 0.18% under heating and an increase rate of melt viscosity of less than 1.05 times by addition of a reactive compound (c), and the polyarylene sulfide (b) has the weight reduction ratio $\Delta Wr$ of not higher than 0.18% under heating and the increase rate of melt viscosity of not less than 1.05 times by addition of the reactive compound (c), wherein the weight reduction ratio is a value expressed by Equation (1) given below:

$$\Delta Wr = (W1 - W2)/W1 \times 100(\%) \quad (1)$$

and calculated from a sample weight (W1) at temperature reaching 100° C. and a sample weight (W2) at temperature reaching 330° C. in thermogravimetric analysis of a sample in a non-oxidizing atmosphere under ordinary pressure with increasing temperature from 50° C. to any temperature of not lower than 330° C. at a temperature rise rate of 20° C./minute, wherein the increase rate of melt viscosity by addition of the reactive compound (c) is a ratio of a first melt viscosity after retention in a melt indexer at 315° C. for 5 minutes with addition of 0.5% by weight of the reactive compound (c) to the polyarylene sulfide (a) or the polyarylene sulfide (b) using [2-(3,4-epoxycyclohexyl)ethyl]trimethoxysilane as the reactive compound (c) to a second melt viscosity measured under conditions identical with those of measurement of the first melt viscosity without addition of reactive compound (c).

2. The polyarylene sulfide resin composition described in 1, the polyarylene sulfide resin composition having the increase rate of melt viscosity by addition of the reactive compound (c) of not less than 1.05 times.

3. The polyarylene sulfide resin composition described in either 1 or 2, the polyarylene sulfide resin composition having the weight reduction ratio expressed by the Equation (1) of not higher than 0.18%.

4. The polyarylene sulfide resin composition describes in any one of 1 to 3, wherein each of the polyarylene sulfide (a) and the polyarylene sulfide (b) has a polydispersity expressed by weight average molecular weight/number average molecular weight of not higher than 2.5.

5. The polyarylene sulfide resin composition described in any one of 1 to 4, wherein the polyarylene sulfide (a) is obtained by heating a prepolymer (d) including a cyclic polyarylene sulfide expressed by General Formula (A) and has a weight average molecular weight of not less than 10,000:

$$\left( Ar - S \right)_{\overline{m}} \quad (A)$$

wherein in the General Formula (A), m denotes an integral number of 4 to 50 and Ar represents arylene group, wherein the cyclic polyarylene sulfide expressed by the General Formula (A) is a single cyclic polyarylene sulfide having a specific number in or a mixture of a plurality of cyclic polyarylene sulfides having different numbers in.

6. The polyarylene sulfide resin composition described in any one of 1 to 5, wherein the polyarylene sulfide (b) is a polyarylene sulfide resin obtained by heating a mixture of a sulfide compound (e) having a reactive functional group expressed by General Formula (B) added to a prepolymer (d) including a cyclic polyarylene sulfide expressed by General Formula (A) at a concentration of 0.1 mol % to 25 mol % relative to 1 mol of an arylene sulfide structural unit, $$\left( Ar - S \right)_{\overline{m}} \quad (A)$$

$$Y - \bigcirc - S - \left( \bigcirc - S \right)_{\overline{n}} - \bigcirc - X \quad (B)$$

wherein in the General Formula (A), in denotes an integral number of 4 to 50 and Ar represents arylene group, wherein the cyclic polyarylene sulfide expressed by the General Formula (A) is a single cyclic polyarylene sulfide having a specific number m or a mixture of a plurality of cyclic polyarylene sulfides having different numbers m, and in the General Formula (B), at least one of Y and X represents a reactive functional group selected from the group consisting of amino group, carboxyl group, hydroxyl group, acid anhydride group, isocyanate group, epoxy group, silanol group, alkoxysilane group and their derivatives and n denotes an integral number of 0 to 20, wherein the sulfide compound (e) having the reactive functional group expressed by the General Formula (B) is a single compound having a specific number n or a mixture of a plurality of compounds having different numbers n.

7. The polyarylene sulfide resin composition described in either 5 or 6, wherein the prepolymer (d) is a polyarylene sulfide prepolymer including at least not lower than 50% by weight of the cyclic polyarylene sulfide expressed by the General Formula (A) and having a weight average molecular weight of less than 10,000.

8. The polyarylene sulfide resin composition described in any one of 1 to 7, wherein the polyarylene sulfide (b) includes a reactive functional group that is any one of amino group, carboxyl group and hydroxyl group, and a content of the reactive functional group in the polyarylene sulfide (b) is 0.01 to 5 mol % per 1 mol of an arylene sulfide structural unit.

9. The polyarylene sulfide resin composition described in any one of 1 to 8, further comprising a fibrous and/or non-fibrous filler (f), wherein a content of the fibrous and/or non-fibrous filler (f) is not lower than 1 part by weight but not higher than 500 parts by weight relative to the total content of the polyarylene sulfide (a) and the polyarylene sulfide (b) that is equal to 100 parts by weight.

10. A manufacturing method of a polyarylene sulfide resin composition, comprising a melt-kneading step of melt kneading a polyarylene sulfide (a) and a polyarylene sulfide (b), wherein a content of the polyarylene sulfide (a) is 95 to 5% by weight relative to a total content of the polyarylene sulfide (a) and the polyarylene sulfide (b) equal to 100% by weight, wherein the polyarylene sulfide (a) has a weight reduction ratio ΔWr of not higher than 0.18% under heating and an increase rate of melt viscosity of less than 1.05 times by addition of a reactive compound (c), and the polyarylene sulfide (a) being obtained by heating a prepolymer (d), which includes a cyclic polyarylene sulfide expressed by General Formula (A) and has a weight average molecular weight of less than 10,000, and having a weight average molecular weight of not less than 10,000:

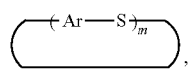
(A)

and the polyarylene sulfide (b) has the weight reduction ratio ΔWr of not higher than 0.18% under heating and the increase rate of melt viscosity of not less than 1.05 times by addition of the reactive compound (c), the polyarylene sulfide (b) being a polyarylene sulfide resin obtained by heating a mixture of a sulfide compound (e) having a reactive functional group expressed by General Formula (B) added to the prepolymer (d) at a concentration of 0.1 mol % to 25 mol % relative to 1 mol of an arylene sulfide structural unit,

(B)

wherein the weight reduction ratio is a value expressed by Equation (1) given below:

$$\Delta Wr = (W1 - W2)/W1 \times 100 (\%) \quad (1)$$

and calculated from a sample weight (W1) at temperature reaching 100° C. and a sample weight (W2) at temperature reaching 330° C. in thermogravimetric analysis of a sample in a non-oxidizing atmosphere under ordinary pressure with increasing temperature from 50° C. to any temperature of not lower than 330° C. at a temperature rise rate of 20° C./minute, wherein the increase rate of melt viscosity by addition of the reactive compound (c) is a ratio of a first melt viscosity after retention in a melt indexer at 315° C. for 5 minutes with addition of 0.5% by weight of the reactive compound (c) to the polyarylene sulfide (a) or the polyarylene sulfide (b) using [2-(3,4-epoxycyclohexyl)ethyl]trimethoxysilane as the reactive compound (c) to a second melt viscosity measured under conditions identical with those of measurement of the first melt viscosity without addition of reactive compound (c), wherein in the General Formula (A), m denotes an integral number of 4 to 50 and Ar represents arylene group, wherein the cyclic polyarylene sulfide expressed by the General Formula (A) is a single cyclic polyarylene sulfide having a specific number m or a mixture of a plurality of cyclic polyarylene sulfides having different numbers m, and in the General Formula (B), at least one of Y and X represents a reactive functional group selected from the group consisting of amino group, carboxyl group, hydroxyl group, acid anhydride group, isocyanate group, epoxy group, silanol group, alkoxysilane group and their derivatives and n denotes an integral number of 0 to 20, wherein the sulfide compound (e) is a single compound having a specific number n or a mixture of a plurality of compounds having different numbers n.

11. The manufacturing method of the polyarylene sulfide resin composition described in 10, wherein the melt-kneading step melt kneads not lower than 1 part by weight but not higher than 500 parts by weight of a fibrous and/or non-fibrous filler (f) added to the total content of the polyarylene sulfide (a) and the polyarylene sulfide (b) that is equal to 100 parts by weight.

12. A molded product of the polyarylene sulfide resin composition described in any one of 1 to 9.

We provide industrially useful polyarylene sulfide resin composition having a low gas generation amount, little mold deposit due to a narrow distribution of molecular weight, and excellent molding processability, as well as excellent adhesiveness to a filling material such as a filler due to the presence of a reactive functional group.

DETAILED DESCRIPTION

The following describes our compositions, methods and molded products in detail.

(1) Polyarylene Sulfide (a)

A polyarylene sulfide (a) is a homopolymer or a copolymer having a repeating unit of formula —(Ar—S)— as the primary structural unit and preferably containing not lower than 80 mol % of this repeating unit (where Ar represents arylene group). Ar may be a unit expressed by any of Formula (C) to Formula (M) given below and is especially preferably a unit of Formula (C):

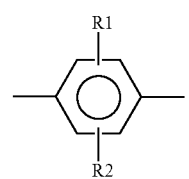
(C)

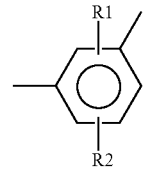
(D)

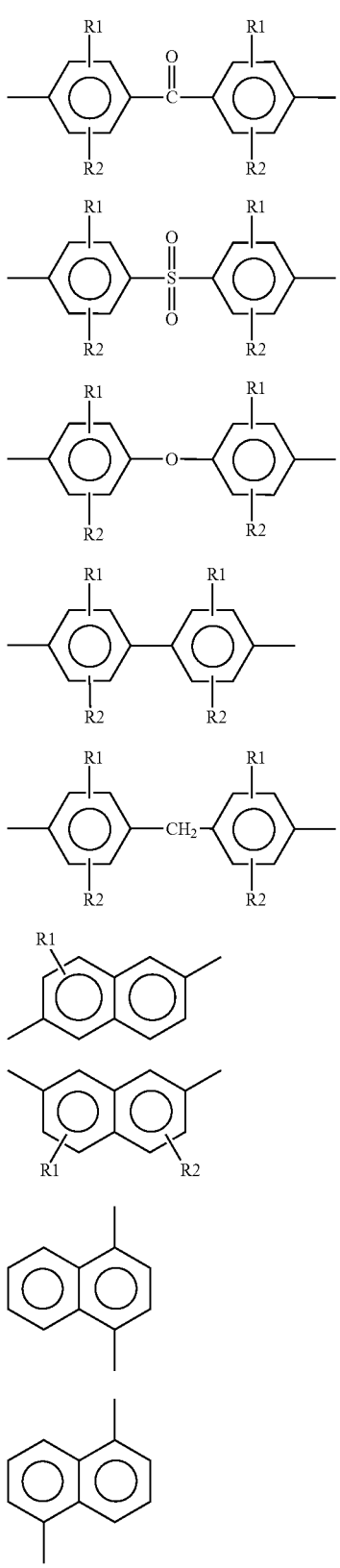

(where each of R1 and R2 represents a substituent selected from the group consisting of hydrogen, alkyl groups containing 1 to 12 carbon atoms, alkoxy groups containing 1 to 12 carbon atoms, arylene groups containing 6 to 24 carbon atoms and halogen groups, and R1 and R2 may be identical with each other or different from each other).

The polyarylene sulfide (a) may include a small amount of a branch unit or a crosslinking unit expressed by any of Formula (N) to Formula (P) given below as long as the polyarylene sulfide (a) has the above repeating unit as the primary structural unit. The amount of copolymerization of this branch unit or crosslinking unit is preferably in the range of 0 to 1 mol % relative to 1 mol of the —(Ar—S)— unit.

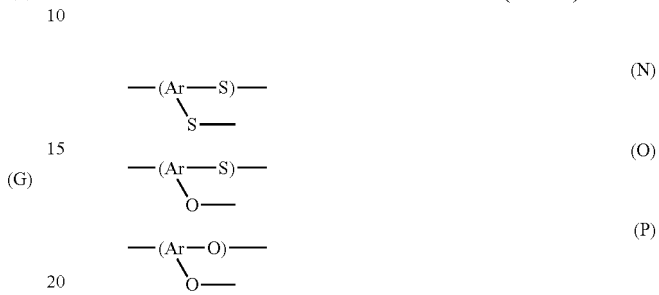

The polyarylene sulfide (a) may be any of a random copolymer, a block copolymer and a mixture thereof including the above repeating unit. Typical examples include polyphenylene sulfide, polyphenylene sulfide sulfone, polyphenylene sulfide ketone, their random copolymers, their block copolymers and mixtures thereof. Especially preferable polyarylene sulfide (a) is polyphenylene sulfide (hereinafter may be abbreviated as PPS) containing not lower than 80 mol % or more specifically not lower than 90 mol % of a p-phenylene sulfide unit as the primary structural unit of the polymer:

The dispersion of the molecular weight distribution, i.e., the polydispersity shown by the ratio of the weight average molecular weight to the number average molecular weight (weight average molecular weight/number average molecular weight), of the polyarylene sulfide (a) obtained according to the embodiment of the invention is preferably not greater than 2.5, is more preferably not greater than 2.3, is furthermore preferably not greater than 2.1 and is especially preferably not greater than 2.0. The lower limit value is not specifically restricted but is, for example, not less than 1.0, is generally not less than 1.2 and may be not less than 1.5. The polydispersity of not greater than 2.5 is likely to decrease the amount of a lower molecular weight component included in the polyarylene sulfide. This is likely to achieve the effects of improving the mechanical properties in the case of application of the polyarylene sulfide for molding process and reducing the gas generation amount under heating and reducing the amount of an eluted component during exposure to a solvent. The weight average molecular weight and the number average molecular weight are determined using SEC (size exclusion chromatography) with a differential refractive index detector.

The molecular weight of the polyarylene sulfide (a) is not specifically limited in such a range that does not interfere with the advantageous effects. As the range of the molecular weight of the polyarylene sulfide (a) expected to exert the sufficient mechanical properties, the weight average molecular weight determined using SEC (size exclusion chromatography) with the differential refractive index detector is preferably in the range of not less than 10,000, is more preferably not less than 15,000 and is especially preferably not less than 20,000. The upper limit of the molecular weight is, for example, not higher than 1,000,000, is preferably not higher than 500,000 and is more preferably not higher than 100,000. The molecular weight in this range enables both the excellent molding processability and the excellent properties to be satisfied.

The weight reduction ratio ΔWr of the polyarylene sulfide (a) is preferably not higher than 0.18%, is more preferably not higher than 0.15%, is furthermore preferably not higher than 0.12% and is specially preferably not higher than 0.1%. The weight reduction ratio ΔWr is a value expressed by Equation (1) given below:

$$\Delta Wr=(W1-W2)/W1\times 100\% \tag{1}$$

More specifically, the weight reduction ratio ΔWr is calculated from a sample weight at temperature reaching 100° C. and a sample weight at temperature reaching 330° C. in thermogravimetric analysis of the polyarylene sulfide (a) as the sample in a non-oxidizing atmosphere under ordinary pressure with increasing temperature from 50° C. to any temperature of not lower than 330° C. at a temperature rise rate of 20° C./minute. The weight reduction ratio ΔWr of higher than 0.18% is undesirable since this is likely to cause a problem, for example, a high gas generation amount during molding process of polyarylene sulfide. The weight reduction ratio ΔWr of higher than 0.18% is also undesirable since this is likely to increase the deposit on a nozzle or a die in the process of extrusion molding or the deposit on a mold in the process of injection molding and reduce the productivity. The lower limit of the weight reduction ratio ΔWr of the polyarylene sulfide (a) is not specifically restricted. The lower weight reduction ratio ΔWr is likely to provide the better properties, but the weight reduction ratio ΔWr is generally in the range of not lower than 0.01%.

The above weight reduction ratio ΔWr may be determined by general thermogravimetric analysis. The atmosphere in this analysis should be a non-oxidizing atmosphere under ordinary pressure. The non-oxidizing atmosphere preferably is an atmosphere that does not substantially contain oxygen, i.e., an inert gas atmosphere such as nitrogen, helium or argon. The ordinary pressure is approximately the pressure of atmospheric temperature and pressure and indicates an atmospheric condition of approximately 101.3 kPa at temperature close to about 25° C. and absolute pressure. An atmosphere other than the above employed as the atmosphere in measurement may cause, for example, oxidation of polyarylene sulfide during measurement or is significantly different from the atmosphere actually used during molding process of polyarylene sulfide. This may result in measurement that does not simulate the practical use of polyarylene sulfide.

The weight reduction ratio ΔWr is measured by thermogravimetric analysis with increasing the temperature from 50° C. to any temperature of not lower than 330° C. at the temperature rise rate of 20° C./minute. A specific procedure holds the sample at 50° C. for 1 minute and subsequently increases the temperature of the sample at the temperature rise rate of 20° C./minute to perform thermogravimetric analysis. This temperature range is a temperature range frequently used in practical use of polyarylene sulfide such as polyphenylene sulfide and is also a temperature range frequently used in the process of melting polyarylene sulfide in a solid state and subsequently molding the melted polyarylene sulfide to any desired shape. The weight reduction ratio in such a temperature range for practical use is related to the gas generation amount from polyarylene sulfide during practical use or the amount of deposit on a nozzle or a mold during molding process. Accordingly, the polyarylene sulfide having the lower weight reduction ratio ΔWr in this temperature range is regarded as better polyarylene sulfide of the higher quality. The amount of sample used for measurement of the weight reduction ratio is about 10 mg. The shape of the sample is a fine granular form having the particle size of not greater than about 2 mm.

The polyarylene sulfide (a) having low gas generation and a narrow distribution of molecular weight may be obtained by a known method. The applicable method is, for example, a method described in WO 2007/034800. More specifically, the polyarylene sulfide (a) may be obtained by heating and melting a prepolymer (d) including a cyclic polyarylene sulfide. For example, a concrete method may place the prepolymer (d) including the cyclic polyarylene sulfide in a reaction vessel and after nitrogen substitution, heat the prepolymer (d) including the cyclic polyarylene sulfide to or above a melting temperature of the prepolymer (d) under nitrogen atmosphere or under reduced pressure. The prepolymer (d) including the cyclic polyarylene sulfide herein means a prepolymer including a cyclic compound of General Formula (Q) given below having a repeating unit of formula —(Ar—S)— as the primary structural unit. This cyclic compound preferably contains not lower than 80 mol % of the above repeating unit. In Formula below, m denotes an integral number of 4 to 50 and Ar represents arylene group. The cyclic polyarylene sulfide expressed by Formula below may be a single cyclic polyarylene sulfide having a specific number m or may be a mixture of a plurality of cyclic polyarylene sulfides having different numbers m. The prepolymer (d) includes at least not lower than 50% by weight of the cyclic compound of Formula.

(Q)

The heating temperature in manufacture of the polyarylene sulfide (a) is preferably a temperature of melting the prepolymer (d) including the cyclic polyarylene sulfide and is not specifically limited in this temperature condition. Setting the heating temperature lower than the melting temperature of the cyclic polyarylene sulfide is, however, likely to extend a time required for obtaining the polyarylene sulfide (a). The melting temperature of the prepolymer (d) including the cyclic polyarylene sulfide is varied according to the composition and the molecular weight of the prepolymer (d) including the cyclic polyarylene sulfide and the environment during heating and is thus not unequivocally specifiable. The melting temperature can, however, be estimated by analysis of the prepolymer (d) including the cyclic polyarylene sulfide, for example, with a differential scanning calorimeter. The lower limit of the heating temperature is, for example, not lower than 180° C., is preferably not lower than 250° C., is more preferably not lower than 300° C. and is furthermore preferably not lower than 320° C. In such a temperature range, the prepolymer (d) including the cyclic polyarylene sulfide is melted, so that the polyarylene sulfide (a) is obtained in a short time period. The excessively high heating temperature is, on the other hand, likely to cause undesirable side reactions such as crosslinking reaction and degradation reaction between the cyclic polyarylene sulfides, between polyarylene sulfides produced by heating and between the polyarylene sulfide and the cyclic polyarylene sulfide. This may result in deteriorating the properties of the obtained polyarylene sulfide (a). It is accordingly desirable to avoid the temperature that significantly causes these undesirable side reactions. The upper limit of the heating temperature is, for example, not higher than 450° C., is preferably not higher than 400° C. and is more preferably not higher than 360° C. The heating temperature of not higher than such temperature is likely to suppress the adverse effects of undesirable side reactions on the properties of the polyarylene sulfide (a) and allows for production of the polyarylene sulfide (a) having the properties described above.

The conversion ratio of the prepolymer (d) including the cyclic polyarylene sulfide into the polyarylene sulfide (a) is preferably not lower than 70%, is more preferably not lower than 80% and is furthermore preferably not lower than 90%. The conversion ratio of not lower than 70% is likely to obtain the polyarylene sulfide (a) having the properties described above. The conversion ratio of the prepolymer (d) including the cyclic polyarylene sulfide into the polyarylene sulfide (a) may be calculated from quantitative values of the amount of the cyclic polyarylene sulfide included in the prepolymer (d) prior to heating and the amount of unreacted cyclic polyarylene sulfide included in the polyarylene sulfide (a) by high-performance liquid chromatography (HPLC). More specifically, the conversion ratio may be calculated by the following equation:

conversion ratio=((amount of cyclic polyarylene sulfide included in prepolymer (d) prior to heating)−(amount of unreacted cyclic polyarylene sulfide included in polyarylene sulfide (a))/(amount of cyclic polyarylene sulfide included in prepolymer (d) prior to heating).

The reaction time depends on various characteristics such as the content of the cyclic compound of Formula given above included in the prepolymer (d) used, the number of repetitions m and the molecular weight and conditions such as the heating temperature and is thus not unequivocally specifiable. It is, however, desirable to set the heating time to minimize the occurrence of the undesirable side reactions described above. The heating time is, for example, not shorter than 0.01 hours and is preferably not shorter than 0.05 hours. The heating time is also, for example, not longer than 100 hours, is preferably not longer than 20 hours and is more preferably not longer than 10 hours.

The polyarylene sulfide (a) obtained by this method does not have a terminal functional group and accordingly has little thickening effect by addition of a reactive compound (c) having a reactive group. More specifically, the polyarylene sulfide (a) has an increase rate of melt viscosity of less than 1.05 times relative to the melt viscosity prior to addition of the reactive compound (c). The increase rate of melt viscosity denotes a ratio of a first melt viscosity measured with addition of the reactive compound (c) to polyarylene sulfide to a second melt viscosity measured under the same conditions as those of the first melt viscosity without addition of the reactive compound (c). More specifically, the melt viscosity is a melt mass flow rate (hereinafter may be abbreviated as MFR), and the increase rate of melt viscosity is calculated by division of MFR of PAS alone by MFR of PAS with addition of the reactive compound (c). We employ a measurement method in conformity with ASTM D-12380-70 for the measurement method of MFR. MFR represents the flow rate of resin per unit time. Accordingly, the higher MFR indicates the lower viscosity, while the lower MFR indicates the higher viscosity.

The reactive compound (c) having the reactive group herein is used to measure the effect of increasing the viscosity in the molten state by a reaction with a terminal group of polyarylene sulfide, for the purpose of checking the increase rate of melt viscosity. The reactive compound (c) used is a silane coupling agent, [2-(3,4-epoxycyclohexyl)ethyl]trimethoxysilane. The amount of addition of the reactive compound (c) is 0.5% by weight relative to the polyarylene sulfide (a).

(2) Polyarylene Sulfide (b)

A polyarylene sulfide (b) is a homopolymer or a copolymer having a repeating unit of formula —(Ar—S)— as the primary structural unit and preferably containing not lower than 80 mol % of this repeating unit (where Ar represents arylene group). Ar may be a unit expressed by any of Formula (C) to Formula (M) given below and is especially preferably a unit of Formula:

(C)

(D)

(E)

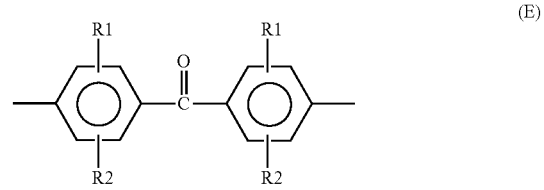

(F)

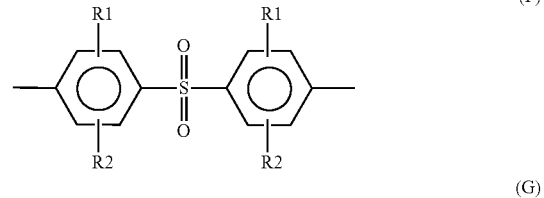

(G)

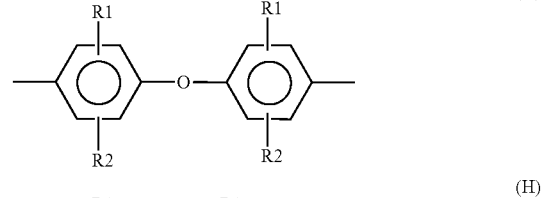

(H)

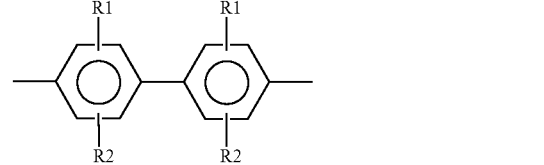

-continued

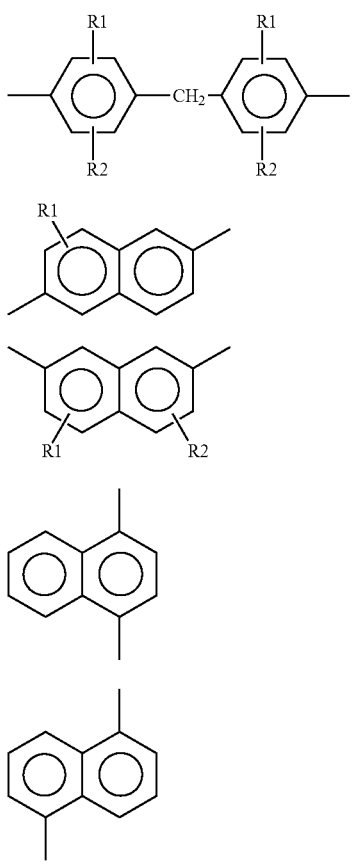

(I)
(J)
(K)
(L)
(M)

(where each of R1 and R2 represents a substituent selected from the group consisting of hydrogen, alkyl groups containing 1 to 12 carbon atoms, alkoxy groups containing 1 to 12 carbon atoms, arylene groups containing 6 to 24 carbon atoms and halogen groups, and R1 and R2 may be identical with each other or different from each other).

The polyarylene sulfide (b) may include a small amount of a branch unit or a crosslinking unit expressed by any of Formula to Formula given below as long as the polyarylene sulfide (b) has the above repeating unit as the primary structural unit. The amount of copolymerization of this branch unit or crosslinking unit is preferably in the range of 0 to 1 mol % relative to 1 mol of the —(Ar—S)— unit.

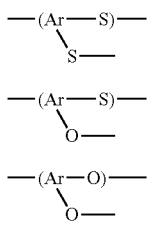

(N)
(O)
(P)

The polyarylene sulfide (b) may be any of a random copolymer, a block copolymer and a mixture thereof including the above repeating unit. Typical examples include polyphenylene sulfide, polyphenylene sulfide sulfone, polyphenylene sulfide ketone, their random copolymers, their block copolymers and mixtures thereof. Especially preferable polyarylene sulfide (b) is polyphenylene sulfide containing not lower than 80 mol % or more specifically not lower than 90 mol % of a p-phenylene sulfide unit as the primary structural unit of the polymer:

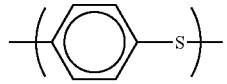

The dispersion of the molecular weight distribution, i.e., the polydispersity shown by the ratio of the weight average molecular weight to the number average molecular weight (weight average molecular weight/number average molecular weight), of the obtained polyarylene sulfide (b) is preferably not greater than 2.5, is more preferably not greater than 2.3, is furthermore preferably not greater than 2.1 and is especially preferably not greater than 2.0. The lower limit value is not specifically restricted but is, for example, not less than 1.0, is generally not less than 1.2 and may be not less than 1.5. The polydispersity of not greater than 2.5 is likely to decrease the amount of a lower molecular weight component included in the polyarylene sulfide. This is likely to achieve the effects of improving the mechanical properties in the case of application of the polyarylene sulfide for molding process and reducing the gas generation amount under heating and reducing the amount of an eluted component during exposure to a solvent. The weight average molecular weight and the number average molecular weight are determined using SEC (size exclusion chromatography) with a differential refractive index detector.

The weight reduction ratio ΔWr of the polyarylene sulfide (b) is preferably not higher than 0.18%, is more preferably not higher than 0.15%, is furthermore preferably not higher than 0.12% and is specially preferably not higher than 0.1%. The weight reduction ratio ΔWr is a value expressed by Equation (1) given below:

$$\Delta Wr = (W1 - W2)/W1 \times 100\% \qquad (1)$$

More specifically, the weight reduction ratio ΔWr is calculated from a sample weight at temperature reaching 100° C. and a sample weight at temperature reaching 330° C. in thermogravimetric analysis of the polyarylene sulfide (b) as the sample in a non-oxidizing atmosphere under ordinary pressure with increasing temperature from 50° C. to any temperature of not lower than 330° C. at a temperature rise rate of 20° C./minute. The weight reduction ratio ΔWr of higher than 0.18% is undesirable since this is likely to cause a problem, for example, a high gas generation amount during molding process of polyarylene sulfide. The weight reduction ratio ΔWr of higher than 0.18% is also undesirable since this is likely to increase the deposit on a nozzle or a die in the process of extrusion molding or the deposit on a mold in the process of injection molding and decrease the productivity. The lower limit of the weight reduction ratio ΔWr of the polyarylene sulfide (b) is not specifically restricted. The lower weight reduction ratio ΔWr is likely to provide the better properties, but the weight reduction ratio ΔWr is generally in the range of not lower than 0.01%. The above weight reduction ratio ΔWr may be determined by the general thermogravimetric analysis described above.

The polyarylene sulfide (b) is obtained by heating a mixture of a prepolymer (d) including a cyclic polyarylene sulfide with addition of a sulfide compound (e) having a reactive functional group at a concentration of 0.1 mol % to 25 mol % to 1 mol of arylene sulfide structural unit. The arylene sulfide structural unit herein means a repeating unit expressed by —(Ar—S)—. More specifically, the polyarylene sulfide (b) is obtained by placing the prepolymer (d) including the cyclic polyarylene sulfide and the sulfide compound (e) in a reaction vessel and after nitrogen substitution of the reaction vessel, heating the prepolymer (d) including the cyclic polyarylene sulfide and the sulfide compound (e) to or above a melting temperature of the prepolymer (d) and the sulfide compound (e) under nitrogen atmosphere. The prepolymer (d) and the sulfide compound (e) may be exposed to reduced pressure after being heated under nitrogen atmosphere.

The sulfide compound (e) herein means a sulfide compound having a reactive terminal group expressed by Formula (B):

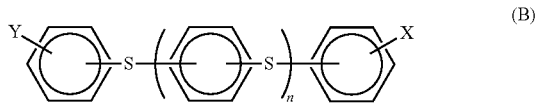

In this formula, at least one of Y and X represents a reactive functional group selected from the group consisting of amino group, carboxyl group, hydroxyl group, acid anhydride group, isocyanate group, epoxy group, silanol group, alkoxysilane group and their derivatives and is preferably the reactive functional group selected among amino group, carboxyl group and hydroxyl group. Either one of Y and X may be hydrogen. The sulfide compound (e) may be a single sulfide compound having specific Y and X or may be a mixture of sulfide compounds having a difference in at least one of Y and X.

The heating temperature in manufacture of the polyarylene sulfide (b) is preferably a temperature of melting a reaction mixture of the prepolymer (d) including the cyclic polyarylene sulfide and the sulfide compound (e) having the reactive functional group and is not specifically limited in this temperature condition. Setting the heating temperature lower than the melting temperature of the prepolymer (d) including the cyclic polyarylene sulfide is, however, likely to extend a time required for obtaining the polyarylene sulfide (b).

The melting temperature of the reaction mixture of the prepolymer (d) including the cyclic polyarylene sulfide and the sulfide compound (e) having the reactive functional group is varied according to the composition and the molecular weight of the prepolymer (d) including the cyclic polyarylene sulfide, the structure and the properties of the sulfide compound (e) and the environment during heating and is thus not unequivocally specifiable. The melting temperature can, however, be estimated by analysis of the reaction mixture of the prepolymer (d) including the cyclic polyarylene sulfide and the sulfide compound (e), for example, with a differential scanning calorimeter. The lower limit of the heating temperature is, for example, not lower than 180° C., is preferably not lower than 250° C., is more preferably not lower than 300° C. and is furthermore preferably not lower than 320° C. In such temperature range, the reaction mixture of the prepolymer (d) including the cyclic polyarylene sulfide and the sulfide compound (e) is melted so that the polyarylene sulfide (b) is obtained in a short time period. The excessively high heating temperature is, on the other hand, likely to cause undesirable side reactions such as crosslinking reaction and degradation reaction between the cyclic polyarylene sulfides, between polyarylene sulfides produced by heating and between the polyarylene sulfide and the cyclic polyarylene sulfide. This may result in deteriorating the properties of the obtained polyarylene sulfide (b). It is accordingly desirable to avoid the temperature that significantly causes these undesirable side reactions. The upper limit of the heating temperature is, for example, not higher than 450° C., is preferably not higher than 400° C. and is more preferably not higher than 360° C. The heating temperature of not higher than such temperature is likely to suppress the adverse effects of undesirable side reactions on the properties of the polyarylene sulfide (b) and allows for production of the polyarylene sulfide (b) having the properties described above.

The reaction time depends on various characteristics of the prepolymer (d) including the cyclic polyarylene sulfide used such as the content of the cyclic compound of Formula (Q) given above, the number of repetitions m and the molecular weight, the type of the sulfide compound (e) used and conditions such as the heating temperature and is thus not unequivocally specifiable. It is, however, desirable to set the heating time to minimize the occurrence of the undesirable side reactions described above. The heating time is, for example, not shorter than 0.01 hours and is preferably not shorter than 0.05 hours. The heating time is also, for example, not longer than 100 hours, is preferably not longer than 20 hours and is more preferably not longer than 10 hours.

The amount of addition of the sulfide compound (e) in manufacture of the polyarylene sulfide (b) is preferably 0.1 mol % to 25 mol %, is more preferably 0.1 to 20 mol % and is especially preferably 0.1 to 15 mol % relative to 1 mol of the arylene sulfide structural unit of the prepolymer (d) including the cyclic polyarylene sulfide. Setting the amount of addition of the sulfide compound (e) to 0.1 mol % to 25 mol % is preferable, since the resulting polyarylene sulfide (b) has a reactive functional group and the sufficient molecular weight to achieve the practical mechanical properties and is also likely to have low gas generation and excellent molding processability.

The molecular weight of the polyarylene sulfide (b) is not specifically limited in such a range that does not interfere with the advantageous effects. As the range of the molecular weight of the polyarylene sulfide (b) expected to exert the sufficient mechanical properties, the weight average molecular weight determined using SEC (size exclusion chromatography) with the differential refractive index detector is preferably not less than 10,000, is more preferably not less than 15,000 and is especially preferably not less than 20,000. The upper limit of the molecular weight is, for example, not higher than 1,000,000, is preferably not higher than 500,000 and is more preferably not higher than 100,000.

The polyarylene sulfide (b) obtained by this method has a reactive functional group at its terminal and accordingly exerts the thickening effect by addition of a reactive compound (c) having a reactive group. The increase rate of melt viscosity relative to the melt viscosity prior to addition of the reactive compound is preferably not less than 1.05 times, is more preferably not less than 1.07 times and is especially preferably not less than 1.10 times.

The above increase rate of melt viscosity of less than 1.05 times is undesirable, since the reactive functional group sufficient to achieve the advantageous effects of the invention is not introduced in the polyarylene sulfide (b).

The reactive compound (c) having the reactive group herein is used to measure the effect of increasing the viscosity in the molten state by a reaction with a terminal group of polyarylene sulfide, for the purpose of checking the increase rate of melt viscosity. The reactive compound (c) used may be a silane coupling agent, [2-(3,4-epoxycyclohexyl)ethyl]trimethoxysilane. The amount of addition of the reactive compound (c) is 0.5% by weight relative to the polyarylene sulfide (b). The reaction of the reactive compound (c) with the terminal functional group of polyarylene sulfide may work as an index of the increase rate of melt viscosity. In other words, the thickening effect achieved by addition of the reactive compound (c) to polyarylene sulfide suggests that the polyarylene sulfide has a reactive functional group.

For example, 0.5% by weight of [2-(3,4-epoxycyclohexyl)ethyl]trimethoxysilane is added as the reactive compound (c) to the polyarylene sulfide (b), and the melt viscosity is measured with a melt indexer after retention at 315.5° C. for 5 minutes. When this measured melt viscosity is not less than 1.05 times of the melt viscosity of the polyarylene sulfide (b) after retention at 315.5° C. for 5 minutes, this suggests that the sufficient reactive functional group is included in the polyarylene sulfide (b). The melt viscosity herein may be measured by a method in conformity with ASTM D-12380-70.

Examples of the reactive functional terminal group introducible to the polyarylene sulfide (b) include amino group, carboxyl group, hydroxyl group, acid anhydride group, isocyanate group, epoxy group, silanol group, alkoxysilane group and their derivatives. In terms of the application of polyarylene sulfide, especially preferable are amino group, carboxyl group and hydroxyl group, which are the functional groups included at the terminal of polyphenylene sulfide such as polyarylene sulfide.

The amount of the functional group introduced at the terminal of the polyarylene sulfide (b) is preferably not lower than 0.01 mol %, is more preferably not lower than 0.05 mol % and is most preferably 0.1 mol % relative to 1 mol of the arylene sulfide structural unit of the polyarylene sulfide (b). The amount of the functional group introduced as described above is also preferably not higher than 5 mol %, is more preferably not higher than 3 mol % and is most preferably not higher than 2.7 mol % relative to 1 mol of the arylene sulfide structural unit of the polyarylene sulfide (b).

Setting the amount of the reactive functional group introduced at the terminal of the polyarylene sulfide (b) to 0.01 mol % to 5 mol % is preferable, since the resulting polyarylene sulfide (b) has a reactive functional group sufficient to achieve the advantageous effects of the invention and the weight average molecular weight of not less than about 10,000 which is the sufficient molecular weight to achieve the practical mechanical properties and is also likely to have low gas generation and excellent molding processability.

The conversion ratio of the prepolymer (d) including the cyclic polyarylene sulfide into the polyarylene sulfide (b) according to the manufacturing method is preferably not lower than 70%, is more preferably not lower than 80% and is furthermore preferably not lower than 90%. The conversion ratio of not lower than 70% is likely to obtain the polyarylene sulfide (b) having the properties described above. The conversion ratio of the prepolymer (d) including the cyclic polyarylene sulfide into the polyarylene sulfide (b) may be calculated from quantitative values of the amount of the cyclic polyarylene sulfide included in the prepolymer (d) prior to heating and the amount of unreacted cyclic polyarylene sulfide included in the polyarylene sulfide (b) by high-performance liquid chromatography (HPLC). More specifically, the conversion ratio may be calculated by the following equation:

conversion ratio=((amount of cyclic polyarylene sulfide included in prepolymer (d) prior to heating)−(amount of unreacted cyclic polyarylene sulfide included in polyarylene sulfide (b))/(amount of cyclic polyarylene sulfide included in prepolymer (d) prior to heating).

(3) Prepolymer (d) Including Cyclic Polyarylene Sulfide

The prepolymer (d) including the cyclic polyarylene sulfide used in manufacture of the polyarylene sulfides (a) and (b) is a prepolymer including a cyclic compound of Formula (Q) given below having a repeating unit of formula —(Ar—S)— as the primary structural unit. This cyclic compound preferably contains not lower than 80 mol % of the above repeating unit. In Formula (Q) below, the number of repetitions m denotes an integral number of 4 to 50, and Ar represents arylene group. The cyclic polyarylene sulfide expressed by Formula (Q) below may be a single cyclic polyarylene sulfide having a specific number of repetitions m or may be a mixture of a plurality of cyclic polyarylene sulfides having different numbers of repetitions m. The prepolymer (d) includes at least not lower than 50% by weight, preferably not lower than 70% by weight, more preferably not lower than 80% by weight and furthermore preferably not lower than 90% by weight of the cyclic compound of Formula (Q).

(Q)

The upper limit value of the content of the cyclic polyarylene sulfide in the prepolymer (d) including the cyclic polyarylene sulfide is not specifically restricted but is, for example, not higher than 98% by weight and is preferably of not higher than 95% by weight. In general, the higher weight ratio of the cyclic polyarylene sulfide to the prepolymer (d) including the cyclic polyarylene sulfide is likely to increase the molecular weight of the resulting polyarylene sulfide obtained after heating and is likely to reduce the gas generation amount.

The weight ratio of the cyclic polyarylene sulfide to the prepolymer (d) including the cyclic polyarylene sulfide that exceeds the above upper limit value is likely to increase the melting temperature of the reaction mixture. Setting the weight ratio of the cyclic polyarylene sulfide to the above range is preferable, since this further decreases the temperature in conversion of the prepolymer (d) including the cyclic polyarylene sulfide into a higher molecular-weight polymer. Ar may be any of the units expressed by Formula (C) to Formula (M) given above, and Formula (C) is especially preferable.

The cyclic compound of Formula (Q) above in the prepolymer (d) may have repeating units containing the arylene group selected from Formula (C) to Formula (M) above at random, may have a sequential linkage of a plurality of specific repeating units, may be a mixture thereof. Typical examples include cyclic polyphenylene sulfide, cyclic polyphenylene sulfide sulfone, cyclic polyphenylene sulfide ketone, their cyclic random copolymers, their cyclic block copolymers and mixtures thereof. Especially preferable cyclic compound of Formula (Q) above is a cyclic compound containing not lower than 80 mol % or more specifically containing not lower than 90 mol % of the following p-phenylene sulfide unit as the primary structural unit:

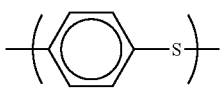

The number of repetitions m in Formula (Q) expressing the cyclic polyarylene sulfide in the prepolymer (d) is not specifically limited but is preferably 4 to 50, is more preferably 4 to 25, and is furthermore preferably 4 to 15. It is further preferable that the cyclic compound of Formula (Q) includes a cyclic compound having the above number of repetitions m of not less than 8 as the major component. As described later, it is preferable to convert the cyclic polyarylene sulfide into the polyarylene sulfide by heating the prepolymer (d) at a temperature of not lower than the melting temperature of the cyclic polyarylene sulfide. The greater number of repetitions m is likely to cause the higher melting temperature of the cyclic polyarylene sulfide. Setting the number m to the above range is advantageous in terms of allowing for conversion of the cyclic polyarylene sulfide into the polyarylene sulfide at the lower temperature. The cyclic compound having the number m of not greater than 7 is likely to have low reactivity. Setting the number m to not less than 8 advantageously provides polyarylene sulfide in a shorter time.

The cyclic compound of Formula (Q) above in the prepolymer (d) may be either a single cyclic compound having a specific number of repetitions m or a mixture of a plurality of cyclic compounds having different numbers of repetitions m. The mixture of the cyclic compounds having different numbers of repetitions m is, however, more likely to have the lower melting temperature than the single cyclic compound having a specific number of repetitions m. It is accordingly preferable to use the mixture of the plurality of cyclic compounds having different numbers of repetitions m, since this further decreases the temperature for conversion of the cyclic polyarylene sulfide into the polyarylene sulfide.

The component other than the cyclic compound of Formula (Q) above in the prepolymer (d) including the cyclic polyarylene sulfide is especially preferably a polyarylene sulfide oligomer. The polyarylene sulfide oligomer herein is a linear homo-oligomer or co-oligomer having a repeating unit of formula —(Ar—S)— as the primary structural unit and preferably containing not lower than 80 mol % of this repeating unit. Ar may be a unit expressed by any of Formula (C) to Formula (M) given above and is especially preferably a unit of Formula (C). The polyarylene sulfide oligomer may include a small amount of a branch unit or a crosslinking unit expressed by any of Formula (N) to Formula (P) given above as long as the polyarylene sulfide oligomer has the above repeating unit as the primary structural unit. The amount of copolymerization of this branch unit or crosslinking unit is preferably in the range of 0 to 1 mol % relative to 1 mol of the —(Ar—S)— unit. The polyarylene sulfide oligomer may be any of a random copolymer, a block copolymer and a mixture thereof including the above repeating unit.

Typical examples of the component other than the cyclic compound of Formula (Q) include polyphenylene sulfide oligomer, polyphenylene sulfide sulfone oligomer, polyphenylene sulfide ketone oligomer, their random copolymers, their block copolymers and mixtures thereof. Especially preferable polyarylene sulfide oligomer is a polyphenylene sulfide oligomer containing not lower than 80 mol % or more specifically not lower than 90 mol % of p-phenylene sulfide unit as the primary structural unit of the polymer.

The molecular weight of the polyarylene sulfide oligomer is typically lower than the molecular weight of polyarylene sulfide and is preferably less than 10,000 as the weight average molecular weight.

The prepolymer (d) including the cyclic polyarylene sulfide used in manufacture of the polyarylene sulfides (a) and (b) may have the weight average molecular weight of less than 10,000. The upper limit value of the molecular weight of the prepolymer (d) is preferably less than 10,000, is more preferably not greater than 5,000 and is furthermore preferably not greater than 3,000 as the weight average molecular weight. The lower limit value of the molecular weight of the prepolymer (d) is, on the other hand, preferably not less than 300, is more preferably not less than 400 and is furthermore preferably not less than 500 as the weight average molecular weight.

(4) Sulfide Compound (e)

The sulfide compound (e) used in manufacture of the polyarylene sulfide (b) is a reactive terminal group-containing sulfide compound expressed by Formula (B):

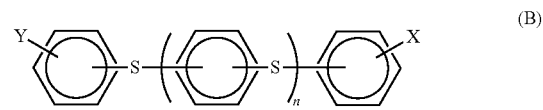

In this formula, at least one of Y and X represents a reactive functional group selected from the group consisting of amino group, carboxyl group, hydroxyl group, acid anhydride group, isocyanate group, epoxy group, silanol group, alkoxysilane group and their derivatives and is preferably the reactive functional group selected among amino group, carboxyl group and hydroxyl group. Either one of Y and X may be hydrogen.

In Formula (B), n denotes an integral number of 0 to 20, is preferably an integral number of 0 to 15 and is more preferably an integral number of 0 to 10. The number n of greater than 20 is undesirable since this is likely to deteriorate the solubility with the cyclic polyarylene sulfide and the low viscosity characteristic. The sulfide compound (e) may be a single compound having a specific number n or may be a mixture of a plurality of compounds having different numbers n.

Concrete examples of the above sulfide compound (e) include bis(2-aminophenyl)sulfide, bis(3-aminophenyl)sulfide, bis(4-aminophenyl)sulfide, bis(2-carboxyphenyl)sulfide, bis(3-carboxyphenyl)sulfide, bis(4-carboxyphenyl)sulfide, bis(2-hydroxyphenyl)sulfide, bis(3-hydroxyphenyl)sulfide, bis(4-hydroxyphenyl)sulfide, bis(4-hydroxy-3-methylphenyl)sulfide, 5,5'-thiodisalicylic acid, 2,2',4,4'-tetrahydroxydiphenyl sulfide and their oligomers.

In terms of the reactivity and the crystallinity, especially preferable examples of the sulfide compound (e) are bis(4-aminophenyl)sulfide, bis(4-carboxyphenyl)sulfide, bis(4-hydroxyphenyl)sulfide and their oligomers.

The sulfide compound (e) used may be one single type of compound or a combination of two or more different types of these compounds.

(5) Reactive Compound (c)

The reactive compound (c) used to check the effect of increasing the melt viscosity of the polyarylene sulfide according to the embodiment of the invention is a silane coupling agent which reacts with a terminal group of the polyarylene sulfide and has the viscosity increasing effect in the molten state. The reactive compound (c) used may be [2-(3,4-epoxycyclohexyl)ethyl]trimethoxysilane.

The silane coupling agent herein is an organosilicon compound having two or more different types of reactive groups in one molecule and exerts the thickening effect by reaction of the reactive groups with terminal functional groups of the polyarylene sulfide. The increase rate of melt viscosity by addition of the reactive compound (c) accordingly works as an index indicating the amount of the terminal functional group of the polyarylene sulfide. The thickening effect achieved by addition of the reactive compound (c) to the polyarylene sulfide accordingly suggests that the polyarylene sulfide has a reactive functional group.

The amount of addition of the reactive compound (c) used to confirm that the polyarylene sulfide may have the reactivity is 0.5% by weight relative to the polyarylene sulfide.

(6) Polyarylene Sulfide Resin Composition

A polyarylene sulfide resin composition includes a polyarylene sulfide (a) and a polyarylene sulfide (b), in which the content of the polyarylene sulfide is 95 to 5% by weight when the total content of the polyarylene sulfide (a) and the polyarylene sulfide (b) is 100% by weight. The polyarylene sulfide (a) (hereinafter also called component (a)) and the polyarylene sulfide (b) (hereinafter also called component (b)) included in the polyarylene sulfide resin composition according to the embodiment of the invention satisfy the following.

The polyarylene sulfide (a) is a polyarylene sulfide resin that has the weight reduction ratio $\Delta Wr$ of not higher than 0.18% under heating and has the increase rate of melt viscosity of less than 1.05 times by addition of the reactive compound (c) having the reactive group relative to the melt viscosity prior to addition of the reactive compound (c). The polyarylene sulfide (b) is a polyarylene sulfide resin that has the weight reduction ratio $\Delta Wr$ of not higher than 0.18% under heating and has the increase rate of melt viscosity of not less than 1.05 times by addition of the reactive compound (c) having the reactive group relative to the melt viscosity prior to addition of the reactive compound (c).

The mixing ratio of the polyarylene sulfide (a) to the polyarylene sulfide (b) is selected in the above range. The mixing ratio may be varied according to the molecular weights of the polyarylene sulfides (a) and (b) and the contents of the reactive functional groups of the polyarylene sulfides (a) and (b) and is not specifically limited in the above range. In terms of low gas generation and economic efficiency, however, the content of the polyarylene sulfide (a) is preferably 95 to 50% by weight, is more preferably 95 to 70% by weight and is furthermore preferably 95 to 90% by weight relative to the total content of the polyarylene sulfide (a) and the polyarylene sulfide (b) equal to 100% by weight.

The content of the component (b) of lower than 5% by weight, i.e., the content of the component (a) of higher than 95% by weight, is undesirable since such content does not exert the sufficient effect of improving the reactivity. The content of the component (b) of higher than 95% by weight, on the other hand, causes difficulty in controlling the amount of the reactive group. The content of the component (b) of higher than 95% by weight is likely to increase the gas generation amount of the polyarylene sulfide resin composition over 0.18% and is thus undesirable further in terms of economic efficiency.

Additionally, in the polyarylene sulfide resin composition, the increase rate of melt viscosity by addition of the reactive compound (c) having the reactive group is preferably not less than 1.05 times of the melt viscosity prior to addition of the reactive compound (c). This increase rate of melt viscosity is more preferably not less than 1.07 times and is especially preferably not less than 1.10 times. The increase rate of melt viscosity of not less than 1.05 times is preferable since this ensures introduction of the sufficient amount of the reactive functional group to achieve the advantageous effects of the invention. Furthermore, in the polyarylene sulfide resin composition, the weight reduction ratio $\Delta Wr$ under heating is preferably not higher than 0.18%. This weight reduction ratio $\Delta Wr$ is more preferably not higher than 0.15%, is furthermore preferably not higher than 0.12% and is especially preferably not higher than 0.1%. The weight reduction ratio $\Delta Wr$ of not higher than 0.18% is preferable since this is likely to reduce the gas generation amount, which may cause a problem in, for example, the molding process of the polyarylene sulfide. The weight reduction ratio $\Delta Wr$ of not higher than 0.18% is also likely to reduce the deposit on a nozzle or a die in the process of extrusion molding or the deposit on a mold in the process of injection molding and is thus preferable in terms of the productivity.

The polyarylene sulfide resin composition is generally obtained by melt kneading. A generally known melt kneader, such as a single-screw extruder, a twin-screw extruder, a Banbury mixer, a kneader, or a mixing roll, may be used for melt kneading. A typical method of manufacturing the polyarylene sulfide resin composition by melt kneading may feed raw materials including a polyarylene sulfide resin to this melt kneader and knead the mixture of the raw materials at a processing temperature of melting peak temperature of the polyarylene sulfide resin+5 to 100° C. In this method, the order of mixing the raw materials is not specifically limited. For example, any of the following methods may be employed: a method of mixing all the raw materials and subsequently melt kneading the mixture by the above method; a method of mixing part of the raw materials, melt kneading the partial mixture by the above method, subsequently adding the remaining raw materials and further melt kneading the resulting mixture; and a method of mixing part of the raw materials and subsequently adding the remaining raw materials using a side feeder during melt kneading of the partial mixture with the single-screw extruder or the twin-screw extruder. With respect to small amounts of additive components in the raw materials, an available procedure may melt-knead and pelletize the other components by the above method or another suitable method, subsequently add these additive components prior to molding and then mold the resulting mixture.

The manufacturing method of the composition may otherwise compress and compact the composition in the solid state to the form of pills and mold the pills by, for example, injection molding.

(7) Fibrous and/or Non-Fibrous Filler (f)

The polyarylene sulfide resin composition may further contain a fibrous and/or non-fibrous filler (f) (hereinafter also called component (O). Examples of the fibrous filler include glass fibers, milled glass fibers, carbon fibers, metal fibers, carbon nanotubes and mineral fibers. The preferable fibrous filler is generally called short-fiber filler having the fiber length of 1 to 5 mm and the fiber diameter of 1 to 25 µm before mixing. Using such short-fiber filler is likely to provide a resin composition having good dispersibility of the filler.

Examples of the non-fibrous filler include: silicates such as wollastonite, zeolite, sericite, mica, talc, kaolin, clay, pyrophyllite, bentonite, asbestos, alumina silicate and glass powder; metal compounds such as alumina, silicon oxide, magnesium oxide, zirconium oxide, titanium oxide and iron oxide; carbonates such as calcium carbonate, magnesium carbonate and dolomite; sulfates such as calcium sulfate and barium sulfate; hydroxides such as calcium hydroxide, magnesium hydroxide and aluminum hydroxide; glass beads, ceramic beads, boron nitride, silicon carbide, graphite, carbon black, fullerene and silica. Any of these fillers may be hollow. Furthermore, two or more of these fillers may be used in combination. It is preferable that any of these fillers is used after pretreatment with a coupling agent such as an isocyanate compound, an organosilane compound, an organotitanate compound, an organoboron compound or an epoxy compound, in terms of obtaining the better mechanical strength.

The mixing amount of such fibrous and/or non-fibrous filler (f) is not higher than 500 parts by weight, is more preferably not higher than 350 parts by weight and is furthermore preferably not higher than 200 parts by weight as the upper limit, relative to the total of the component (a) and the component (b) equal to 100 parts by weight. The lower limit is, on the other hand, not lower than 1 part by weight, is more preferably not lower than 10 parts by weight and is furthermore preferably not lower than 15 parts by weight. The mixing amount of the component (f) of not higher than 500 parts by weight is preferable since the resulting polyarylene sulfide resin composition has melt flowability required for molding. The mixing amount of the component (f) of not lower than 1 part by weight is also preferable since this exerts the sufficient effect of filler reinforcement. The mixing amount of the component (f) may be changed as appropriate for each application, based on the balance between the flowability and the toughness.

The following resin may be added to and mixed with the polyarylene sulfide resin composition in such a range that does not deteriorate the advantageous effects of the invention. Concrete examples include olefin polymers (including copolymers) without containing epoxy group such as polyamide resins, polybutylene terephthalate resins, polyethylene terephthalate resins, modified polyphenylene ether resins, polysulfone resins, polyarylsulfone resins, polyketone resins, polyarylate resins, liquid crystal polymers, polyether ketone resins, polythioether ketone resins, polyether ether ketone resins, polyimide resins, polyether imide resins, polyether sulfone resins, polyamide imide resins, polyethylene tetrafluoride resins, and ethylene-1-butene copolymers.

The following compounds may be added to the polyarylene sulfide resin composition according to the embodiment of the invention for the purpose of modification: plasticizers such as polyalkylene oxide oligomer-based compounds, thioether-based compounds, ester-based compounds and organophosphorus-based compounds; crystal nucleating agents such as organophosphorus compounds and polyether ether ketone; mold release agents such as montanic acid waxes, metal soaps like lithium stearate and aluminum stearate, ethylene diamine-stearic acid-sebacic acid polycondensates and silicone-based compounds; coloring inhibitors such as hypophosphites; phenolic antioxidants such as 3,9-bis[2-(3-(3-t-butyl-4-hydroxy-5-methylphenyl) propionyloxy)-1,1-dimethylethyl]-2,4,8,10-tetraoxaspiro[5,5]undecane; phosphorus antioxidants such as bis(2,4-di-cumylphenyl)pentaerythritol diphosphite, as well as conventional additives including water, lubricants, ultraviolet absorbers, coloring agents and foaming agents. The total amount of addition of any of the above compounds exceeding 20% by weight of the entire resin composition deteriorates the intrinsic properties of the polyarylene sulfide resin and is thus undesirable. The total amount of addition of any of the above compounds is preferably not higher than 10% by weight and is more preferably not higher than 1% by weight of the entire resin composition.

The resin composition is generally obtained by melt kneading as described above. In the case of adding the fibrous and/or non-fibrous filler (f) or in the case of adding the other additives to the resin composition of the component (a) and the component (b), the order of mixing the raw materials including any of these additional components is not specifically limited. One available method may mix all the raw materials and subsequently melt knead the mixture by the above method. Another available method may mix part of the raw materials, melt knead the partial mixture by the above method, subsequently add the remaining raw materials and further melt knead the resulting mixture.

The polyarylene sulfide resin composition has the advantageous effects of a decreased gas generation amount, a narrow distribution of molecular weight and excellent reactivity, in addition to the advantageous effects achieved by the prior art PAS resin, i.e., heat resistance, flame resistance, chemical resistance and excellent mechanical properties and electrical properties. Especially the narrow distribution of molecular weight results in little mold deposit and thereby achieves the excellent molding processability. More specifically, the polyarylene sulfide resin composition is preferably subjected to extrusion molding, as well as injection molding, injection compression molding and blow molding. The PAS resin composition may be molded to extrusion molded products such as sheets, films, fibers and pipes.

The polyarylene sulfide resin composition is characteristic of excellent molding processability and heat resistance. Exemplary applications include: electric and electronic components such as sensors, LED lamps, connectors, sockets, resistors, relay cases, switches, coil bobbins, capacitors, variable capacitor cases, optical pickups, oscillators, various terminal boards, transformers, plugs, printed circuit boards, tuners, speakers, microphones, headphones, small motors, magnetic head bases, power modules, semiconductors, liquid crystals, FDD carriages, FDD chasses, motor brush holders, parabola antennas, and computer-related components; domestic and office electric appliance components such as VTR components, TV set components, irons, irons, hair dryers, rice cooker components, microwave oven components, acoustic components, audio visual equipment components for audio/laserdiscs (registered trademark), compact discs and digital video discs, lighting components, refrigerator components, air conditioner components, typewriter components and word processor components; office computer-related components, telephone-related components, facsimile-related components, copy machine-related components, cleaning jigs, motor components, and machine components for lighters and typewriters; optical equipment and precision machine components, such as microscopes, binoculars, cameras and watches; plumbing components such as packings for faucets, combination faucets, pump components, pipe joints, water flow control valves, relief valves, water temperature sensors, water flow sensors and water meter housings; automobile and vehicle-related components such as valve alternator terminals, alternator connectors, IC regulators, potentiometer bases for light dimmers, various valves including emission valves, various pipes for fuel, exhaust system, and air intake system, air intake nozzle snorkels, intake manifolds, fuel pumps, engine coolant joints, carburetor main bodies, carburetor spacers, emission sensors, coolant sensors, oil temperature sensors, throttle position sensors, crankshaft position sensors, air flowmeters, brake pad wear sensors, thermostat bases for air conditioners, hot air flow control valves, brush holders for radiator motors, water pump impellers, turbine vanes, windshield wiper motor-related components, distributors, starter switches, starter relays, transmission wire harnesses, windshield washer fluid nozzles, air conditioner panel switch plates, fuel solenoid valve coils, fuse connectors, horn terminals, electric component insulators, step motor rotors, lamp sockets, lamp reflectors, lamp housings, brake pistons, solenoid bobbins, engine oil filters, fuel tanks, ignition cases, vehicle speed sensors and cable liners; and other various applications.

EXAMPLES

The following more specifically describes our compositions, methods and molded products with reference to examples. These examples are however, only illustrative and not restrictive.

Measurement of Molecular Weight

With regard to the molecular weights of the polyarylene sulfide and the cyclic polyarylene sulfide, the number average molecular weight (Mn) and the weight average molecular weight (Mw) were measured by gel permeation chromatography (GPC) as one type of size exclusion chromatography (SEC) and were calculated as polystyrene equivalents. The measurement conditions of GPC are given below.

Apparatus: SSC-7100 manufactured by Senshu Scientific Co., Ltd.
Column: GPC3506 manufactured by Senshu Scientific Co., Ltd.
Eluent: 1-chloronaphthalene
Detector: differential refractive index detector
Column temperature: 210° C.
Pre-thermostatic bath temperature: 250° C.
Pump thermostatic bath temperature: 50° C.
Detector temperature: 210° C.
Flow rate: 1.0 mL/min
Sample injection volume: 300 µL (in the form of slurry: about 0.2% by weight)

Measurement of Conversion Ratio

The conversion ratio of the prepolymer including the cyclic polyarylene sulfide into the polyarylene sulfide was calculated by the following procedure using high-performance liquid chromatography (HPLC).

The procedure dissolved about 10 mg of a product obtained by heating the prepolymer including the cyclic polyarylene sulfide in about 5 g of 1-chloronaphthalene at 250° C. The resulting 1-chloronaphthalene solution was cooled to room temperature so that precipitate was produced. The procedure subsequently filtered out a 1-chloronaphthalene insoluble component using a membrane filter having a pore size of 0.45 µm to obtain a 1-chloronaphthalene soluble component. The resulting soluble component was subjected to HPLC measurement to determine an amount of unreacted cyclic polyarylene sulfide and calculated the conversion ratio of the cyclic polyarylene sulfide into the polyarylene sulfide according to a relation to the amount of the cyclic polyarylene sulfide included in the prepolymer. The measurement conditions of HPLC are given below:

Apparatus: LC-10Avp Series manufactured by Shimadzu Corporation
Column: Mightysil RP-18 GP150-4.6 (5 µm)
Detector: photodiode array detector (UV=270 nm)

Measurement of Weight Reduction Ratio Under Heating

The weight reduction ratio of polyarylene sulfide under heating was measured under the following conditions using a thermogravimetric analyzer. The sample was fine particles of 2 mm or smaller size.

Apparatus: TAG7 manufactured by PerkinElmer, Inc.
Measurement atmosphere: under nitrogen stream
Amount of sample added: about 10 mg
Measurement Conditions:
(a) keeping at a programmed temperature of 50° C. for 1 minute; and
(b) raising temperature from the programmed temperature of 50° C. to 350° C. at a temperature rise rate of 20° C./minute.

Analysis of Content of Amino Group

Analysis of amino group introduced into polyarylene sulfide prepared a melt film of the polyarylene sulfide, compared absorption at about 3380 $cm^{-1}$ and 3470 $cm^{-1}$ derived from amino group with absorption at 1900 $cm^{-1}$ derived from benzene ring as an internal standard using FT-IR (infrared spectrometer IR-810 manufactured by JASCO Corporation) and performed relative evaluation of the introduced amount of amino group using this comparison.

A pressed film was produced under the following conditions for measurement of the melt film:
(a) stacking a Kapton (registered trademark) film on an aluminum sheet;
(b) cleaning a surface of the Kapton film with acetone and placing a sample on the surface;
(c) further stacking another Kapton film and another aluminum sheet;
(d) placing the sample stack in a press mold heated to 340° C.;
(e) after retention for 1 minute, applying a pressure of 250 kgf; and
(f) after retention for 3 minutes, taking out the sample with the Kapton film or the aluminum sheet and soaking the sample in water for quenching.

Quantitative Determination of Terminal Functional Group

The amount of the terminal functional group introduced into polyarylene sulfide was determined by performing FT-IR measurement of two different types of films (i) and (ii) described below and calculating a ratio of peak intensity attributing to the functional group.

(i) film produced by press molding a cyclic polyarylene sulfide prepolymer obtained by mixing a cyclic polyarylene sulfide and a sulfide compound having a reactive functional group; and
(ii) film produced by press molding a polyarylene sulfide resin obtained by heating the above cyclic polyarylene sulfide prepolymer.

Herein the infrared spectrophotometer IR-810 manufactured by JASCO Corporation was used for FT-IR measurement.

Melt Viscosity Increase Rate Test

A reactivity test to check for the functional group of polyarylene sulfide measured melt mass flow rates (MFR) using a melt indexer (F-B01 manufactured by Toyo Seiki Seisaku-sho, Ltd. and calculated an increase rate of melt viscosity for comparison from the difference between the melt viscosities before and after addition of [2-(3,4-epoxy-cyclohexyl)ethyl]trimethoxysilane as the silane coupling agent. The measurement after addition of the silane coupling agent was performed according to the following procedure (in conformity with ASTM D-12380-70). The procedure of measurement before addition of the silane coupling agent differs by omission of the following step (b):

(a) weighing 7 g of PAS powder or pellets;
(b) weighing, adding and dry blending 0.35 g (0.5 wt %) of [2-(3,4-epoxycyclohexyl)ethyl]trimethoxysilane to and with the powder or pellets of (a);
(c) placing the mixture to a melt indexer set at 315.5° C. and retaining for 5 minutes; and
(d) measuring the discharge time of a specified amount under 5 kg load.

Bar Flow Length

A molded piece of 150 mm (length)×12.6 mm (width)×0.5 mm (thickness) (gate position: width side of molded piece, gate shape: film gate) was injection molded continually ten times under the conditions of the resin temperature of 320° C., the mold temperature of 130° C., the injection rate set to 99% and the injection pressure set to 45% (observed injection pressure: 98 MPa) using an injection molding machine Promat 40/20 manufactured by Sumitomo Heavy Industries, Ltd. The length of each molded piece in the longitudinal direction from the gate position to the filling end was measured, and its mean value was specified as the bar flow length. The greater value of the bar flow length indicates the better thin-wall flowability.

Injection Molding of Tensile Test Piece

An ASTM No. 1 dumbbell test piece was molded under the conditions of the resin temperature of 320° C. and the mold temperature of 130° C. using an injection molding machine SE75-DUZ manufactured by Sumitomo Heavy Industries, Ltd.

Tensile Test

The tensile strength and the tensile elongation of the above injection-molded ASTM No. 1 dumbbell test piece were measured in conformity with ASTM D638 under the conditions of the span of 114 mm and the tension rate of 10 mm/min using a tension tester Tensilon UTA2.5T. The greater value indicates the better tensile properties.

Injection Molding of Flexural Test Piece

A flexural test piece of 12.5 mm (width)×130 mm (length)×3.2 mm (thickness) was molded under the conditions of the resin temperature of 320° C. and the mold temperature of 130° C. using the injection molding machine SE75-DUZ manufactured by Sumitomo Heavy Industries, Ltd.

Flexural Test

The flexural strength and the flexural modulus of the above injection-molded flexural test piece were measured in conformity with ASTM D790 under the conditions of the span of 100 mm and the cross-head speed of 1.0 mm/min using a flexural tester Tensilon RTM1T. The greater values indicate the better flexural properties.

Measurement of Heat Distortion Temperature

The deflection temperature under the load of 0.46 MPa of the above injection-molded flexural test piece was measured in conformity with ASTM D648. The greater values indicate the better heat resistance.

Injection Molding of Impact Test Piece

A mold notched Izod impact test piece of 12.7 mm (width)×60 mm (length)×3.2 mm (thickness) was molded under the conditions of the resin temperature of 320° C. and the mold temperature of 130° C. using the injection molding machine SE75-DUZ manufactured by Sumitomo Heavy Industries, Ltd.

Izod Impact Test

The notched Izod impact strength of the above injection-molded mold notched Izod impact test piece was measured in conformity with ASTM D256. The greater value indicates the better impact property.

Prior to description of polyarylene sulfide resin compositions of Examples and Comparative Examples, the following sections 1 to 5 describe the raw materials used for manufacture of the polyarylene sulfide resin compositions of Examples and Comparative Examples.

1 Preparation of First Cyclic Polyarylene Sulfide Mixture

The procedure mixed 14.03 g (0.120 mol) of 48 wt % sodium hydrosulfide aqueous solution, 12.50 g (0.144 mol) of a 48 wt % aqueous solution of 96% sodium hydroxide, 615.0 g (6.20 mol) of N-methyl-2-pyrrolidone (NMP) and 18.08 g (0.123 mol) of p-dichlorobenzene (p-DCB) in a stainless steel autoclave equipped with an agitator. After the reaction vessel was sufficiently substituted with nitrogen, the reaction vessel was sealed under nitrogen gas.

The reaction vessel was heated from room temperature to 200° C. over about 1 hour, while stirring the reaction vessel at 400 rpm. In this stage, the internal pressure of the reaction vessel was 0.35 MPa as the gauge pressure. The reaction vessel was subsequently heated from 200° C. to 270° C. over about 30 minutes. In this stage, the internal pressure of the reaction vessel was 1.05 MPa as the gauge pressure. The procedure kept the reaction vessel at 270° C., subsequently quenched the reaction vessel to about room temperature and collected the content.

The obtained content was subject to analysis by gas chromatography and high-performance liquid chromatography. The p-DCB consumption rate of the monomer was 93%, and the formation rate of cyclic PPS was 18.5% on the assumption that the sulfur content of the reaction mixture was fully converted to cyclic PPS.

The procedure diluted 500 g of the obtained content with about 1500 g of ion exchange water and then filtered the diluted solution with a glass filter having the average aperture of 10 to 16 μm. The procedure repeated a total of three sets of operations of dispersing the filtered solid component in about 300 g of ion exchange water, stirring the dispersion at 70° C. for 30 minutes and filtering the dispersion again as described above, so as to obtain a white solid. A dried solid was obtained by vacuum drying this white solid at 80° C. overnight.

The procedure placed the obtained dried solid in a cylindrical filter paper and performed soxhlet extraction for about 5 hours using chloroform as a solvent, so as to separate a low molecular-weight content included in the above dried solid as a solid component. After the extraction operation, the procedure dried the solid component remaining in the cylindrical filter paper at 70° C. under reduced pressure overnight to obtain about 6.98 g of off-white solid. The absorption spectrum of infrared spectroscopic analysis identified this solid as a compound of phenylene sulfide structure having the weight average molecular weight of 6,300.

The procedure obtained an extract by extraction of the above dried solid with chloroform, removed the solvent from the extract, added about 5 g of chloroform to prepare a slurry, and dropped the slurry with stirring to about 300 g of methanol. The procedure filtered and recovered a resulting precipitate and vacuum dried the precipitate at 70° C. for 5 hours to obtain 1.19 g of white powder. The absorption spectrum of infrared spectroscopic analysis identified this white powder as a compound of phenylene sulfide unit. Mass spectrometry (apparatus: M-1200H manufactured by Hitachi, Ltd.) of the components separated by high-performance liquid chromatography and the molecular weight information by MALDI-TOF-MS identified this white powder as a cyclic polyphenylene sulfide mixture, which includes about 98% by weight of a cyclic compound having a p-phenylene sulfide unit as the primary structural unit and the number of repeating units of 4 to 13 and is preferably used in manufacture of the polyarylene sulfide of the invention. The result of GPC measurement showed that the above cyclic polyphenylene sulfide mixture was fully soluble in 1-chloronaphthalene at room temperature and had the weight average molecular weight of 900. The above cyclic polyarylene sulfide mixture is also called first cyclic polyarylene sulfide mixture.

2 Preparation of Second Cyclic Polyarylene Sulfide Mixture

The procedure mixed 19.8 kg (0.170 kilomol) of 48% sodium hydrosulfide, 14.3 kg (0.172 kilomol) of 48% sodium hydroxide and 100 kg (1.01 kilomol) of N-methyl-2-pyrrolidone (hereinafter may be abbreviated as NMP) in an autoclave equipped with an agitator. The procedure then gradually heated the reaction vessel to about 200° C. over about 2 hours at ordinary pressure under nitrogen stream, distilled out 13.7 kg of water and 12 kg of NMP by a distillation column and then cooled the reaction vessel to 150° C.

The procedure subsequently added 25.7 kg (0.175 kilomol) of p-dichlorobenzene and 264 kg (2.66 kilomol) of NMP and sealed the reaction vessel under nitrogen gas. While stirring the mixture at 150 rpm, the procedure heated the reaction vessel from 150° C. to 250° C. at an average rate of 1.5° C./min, kept the reaction vessel at this temperature for 120 minutes and subsequently cooled down the reaction vessel to 80° C., so as to obtain a slurry (A). Filtration of the obtained slurry (A) through a sintered filter having the average aperture of 10 μm gave a slurry (B) as a filtrate component and a pulverized polyarylene sulfide resin as a filtered solid component.

The procedure placed the obtained slurry (B) in a devolatilization device and after substitution with nitrogen, treated the slurry (B) at 100 to 150° C. under reduced pressure for 2 hours to obtain an about 1/10th volume of concentrated solution. The procedure then heated this concentrated solution to 80° C., added ion exchange water at the concentration of about 25 wt % of the concentrated solution and stirred the mixture for 30 minutes to form a re-slurry. This slurry was subject to suction filtration under reduced pressure with a filter having the aperture of 10 to 16 μm. The procedure added ion exchange water again to the resulting cake, stirred the mixture at 80° C. for 30 minutes to form a re-slurry, made the slurry subject to suction filtration again and repeated this series of operations again. The procedure subsequently vacuum dried the cake at 100° C. for 12 hours to obtain a target polyarylene sulfide mixture. The absorption spectrum of infrared spectroscopic analysis identified this mixture as polyphenylene sulfide. This mixture was also identified by high-performance liquid chromatography as a cyclic polyphenylene sulfide mixture, which includes about 78% by weight of a cyclic polyphenylene sulfide and is preferably used in manufacture of the polyarylene sulfide of the invention. The above cyclic polyarylene sulfide mixture is also called second cyclic polyarylene sulfide mixture.

3 Polymerization of Polyarylene Sulfide (a)

After placing 15 kg of the first cyclic polyarylene sulfide mixture as the prepolymer (d) in a polymerization vessel, the procedure substituted the inside of the polymerization vessel with a nitrogen atmosphere, regulated the temperature to 250° C. and heated the polymerization vessel for 30 minutes and subsequently started stirring and decompression to gradually reduce the pressure to 0.1 kPa. After about 60 minutes elapsed since the start of stirring, the procedure regulated the temperature to 340° C. and heated the vessel for 120 minutes while maintaining the pressure at about 0.1 kPa. The procedure subsequently increased the internal pressure of the polymerization vessel to ordinary pressure by nitrogen substitution, discharged the content in the form of strings in cold water, cut the strings with a cutter and dried the cut strings with hot air at 130° C. for 3 hours to obtain a pelletized polymer (product). The yield of the product was 95%. The FT-IR spectrum of infrared spectroscopy identified the resulting product as polyphenylene sulfide with no presence of a terminal group. The result of GPC measurement showed that the resulting product had the weight average molecular weight of about 50,000 and the polydispersity of 2.35. The result of HPLC measurement showed that the conversion ratio of the first cyclic polyphenylene sulfide mixture used as the prepolymer (d) into PPS was 97.8%. The weight reduction ratio ΔWr of the resulting product under heating was measured to be 0.055%. The increase rate of melt viscosity after addition of 0.5 wt % of [2-(3,4-epoxycyclohexyl)ethyl]trimethoxysilane was 0.98 times. The above product is polyarylene sulfide (A-1).

4 Polymerization of Polyarylene Sulfide (b)

After placing 15 kg of the second cyclic polyarylene sulfide mixture as the prepolymer (d) and 150 g of bis(4-aminophenyl)sulfide in a polymerization vessel, the procedure substituted the inside of the polymerization vessel with a nitrogen atmosphere, regulated the temperature to 250° C. and heated the polymerization vessel for 30 minutes and subsequently started stirring. After about 60 minutes elapsed since the start of stirring, the procedure regulated the temperature to 340° C. and, after reaching 340° C., heated the vessel for 120 minutes. After heating for 120 minutes, the procedure started decompression and reduced the pressure to 0.1 kPa in 30 minutes. After further heating the polymerization vessel for another 30 minutes while keeping the internal pressure of the polymerization vessel at 0.1 kPa, the procedure increased the internal pressure of the polymerization vessel to ordinary pressure by nitrogen substitution, discharged the content in the form of strings in cold water, cut the strings with a cutter and dried the cut strings with hot air at 130° C. for 3 hours to obtain a pelletized polymer (product). The yield of the product was 96%. The FT-IR spectrum of infrared spectroscopy identified the resulting product as polyphenylene sulfide and showed that the content of amino group was 0.3 mol % relative to 1 mol of the polyphenylene sulfide structural unit. The result of GPC measurement showed that the resulting product had the weight average molecular weight of about 21,000 and the polydispersity of 1.98. The result of HPLC measurement showed that the conversion ratio of the second cyclic polyphenylene sulfide mixture used as the prepolymer (d) into PPS was 96.5%. The weight reduction ratio ΔWr of the resulting product under heating was measured to be 0.078%. The increase rate of melt viscosity after addition of 0.5 wt % of [2-(3,4-epoxycyclohexyl)ethyl]trimethoxysilane was 1.20 times. The above product is polyarylene sulfide (B-1).

Fibrous Filler (f)

Glass fiber (T747 manufactured by Asahi Fiber Glass Co., Ltd., average fiber diameter: 13 μm, average fiber length: 3 mm) was used as the fibrous filler (f). This glass fiber is fibrous filler (F-1).

Examples 1 to 4, Comparative Examples 1 to 4

Polyarylene sulfide resin compositions of Examples 1 to 4 and Comparative Examples 1 to 4 were manufactured using the polyarylene sulfide (A-1) as the component (a), the polyarylene sulfide (B-1) as the component (b) and the fibrous filler (F-1) as the component (f). In manufacture of the PAS resin compositions of the respective Examples and Comparative Examples, the component (a), the component (b) and the component (f) were fed at the ratios shown in Table 1 to a twin-screw extruder TEX 30α with a vacuum vent manufactured by the Japan Steel Works, LTD. (L/D=45.5, five kneading sections). More specifically, the component (a) and the component (b) were fed from the base of the extruder (position of L/D=45.5 from a die head) (main feeding), whereas the component (f) was fed in the middle from the position of L/D=15 from the die head using a side feeder (side feeding). Using both the component (a) and the component (b), these two components were dry blended, prior to main feeding. The respective components were melt-kneaded using the above extruder at the screw rotation speed of 300 rpm and the cylinder temperature set to control the resin temperature in the die discharge outlet to not higher than 330° C., and were pelletized with a strand cutter. The pellets dried at 130° C. overnight were subject to injection molding and were evaluated for the weight reduction ratio ΔWr under heating, the bar flow length, the tensile properties, the flexural properties, the impact property and the heat distortion temperature. The results of evaluation are shown in Table 1.

The following describes comparison of the results of Examples 1 to 4 and Comparative Examples 1 to 4 above.

While Comparative Example 1 using only the component (a) as the polyarylene sulfide of the raw materials had the increase rate of melt viscosity of 0.98, the increase rate of melt viscosity was raised to 1.10 for Example 1 using the mixture of the component (a) with the component (b) and to 1.17 for Example 3 using the mixture of the component (a) with the component (b). This indicates the presence of a reactive functional group of the polyarylene sulfide resin composition using the component (b) in addition to the component (a) as the polyarylene sulfides of the raw materials. Additionally, compared with Comparative Example 2 adding the component (f) but not the component (b), Examples 2 and 4 adding the component (b) and the component (f) to the component (a) has the better mechanical properties (tensile properties and flexural properties) and the heat resistance. This may be attributed to that the effect of providing the reactive group by addition of the component (b) in Examples 2 and 4 improves the affinity between the polyarylene sulfide and the component (f). Comparative Example 3 manufactured using only the component (b) had the raised increase rate of melt viscosity of 1.20. This indicates the presence of a reactive functional group. Irrespective of using the component (b) having a reactive functional group, Comparative Example 4 adding the component (1) but not the component (a) as the polyarylene sulfide has the poorer mechanical properties and the lower heat resistance than Examples 2 and 4 adding the component (a) to the component (b). This may be attributed to the low molecular weight of the component (b).

TABLE 1

| | | EX 1 | EX 2 | EX 3 | EX 4 | COMP EX 1 | COMP EX 2 | COMP EX 3 | COMP EX 4 |
|---|---|---|---|---|---|---|---|---|---|
| Polyphenylene sulfide (a) | type | A-1 | A-1 | A-1 | A-1 | A-1 | A-1 | — | — |
| | % by weight | 90 | 90 | 50 | 50 | 100 | 100 | — | — |
| Polyphenylene sulfide (b) | type | B-1 | B-1 | B-1 | B-1 | — | — | B-1 | B-1 |
| | % by weight | 10 | 10 | 50 | 50 | — | — | 100 | 100 |
| Fibrous filler (f) | type | — | F-1 | — | F-1 | — | F-1 | — | F-1 |
| | parts by weigh*[1] | — | 70 | — | 70 | — | 70 | — | 70 |
| Kneading method | | *2) | *3) | *2) | *3) | *2) | *4) | *2) | *5) |
| Weight reduction ratio( Δ Wr) | % | 0.07 | 0.04 | 0.09 | 0.05 | 0.06 | 0.03 | 0.08 | 0.05 |
| Increase rate of melt viscosity | % | 1.10 | — | 1.17 | — | 0.98 | — | 1.20 | — |
| Bar flow length (0.5 mm in thickness) | mm | 116 | 65 | 120 | 63 | 120 | 62 | 127 | 65 |
| Tensile strength | MPa | 94 | 192 | 84 | 182 | 95 | 163 | 77 | 155 |
| Tensile elongation | % | 6.5 | 4.8 | 5.2 | 4.5 | 7.0 | 3.9 | 3.1 | 3.7 |
| Flexural strength | MPa | 155 | 252 | 163 | 237 | 165 | 221 | 160 | 220 |
| Flexural modulus | GPa | 3.82 | 13.61 | 3.92 | 12.69 | 3.68 | 12.29 | 3.98 | 12.01 |
| Notched Izod impact strength | J/m | 28 | 101 | 17 | 95 | 32 | 89 | 14 | 84 |
| Heat distortion temperature (under 1.82 MPa) | ° C. | 230 | 267 | 237 | 268 | 225 | 255 | 238 | 260 |

*[1])Mixing amount relative to the total of the component (a) and the component (b) equal to 100 parts by weight
*2) Kneading simultaneously
*3) Feeding (a) and (b) from main feeder and (f) from side feeder
*4) Feeding (a) from main feeder and (f) from side feeder
*5) Feeding (b) from main feeder and (f) from side feeder

The invention claimed is:

1. A method of manufacturing a polyarylene sulfide resin composition comprising:
    melt kneading a polyarylene sulfide (a) and a polyarylene sulfide (b), wherein
    1) a content of the polyarylene sulfide (a) is 95 to 5% by weight relative to a total content of the polyarylene sulfide (a) and the polyarylene sulfide (b) equal to 100% by weight,
    2) the polyarylene sulfide (a) has a weight reduction ratio ΔWr of not higher than 0.18% under heating and an increase rate of melt viscosity of less than 1.05 times by addition of a reactive compound (c), the weight reduction ratio being a value expressed by Equation (1):

$$\Delta Wr = (W1 - W2)/W1 \times 100(\%) \quad (1)$$

and calculated from a sample weight (W1) at a temperature reaching 100° C. and a sample weight (W2) at a temperature reaching 330° C. in thermogravimetric analysis of a sample in a nonoxidizing atmosphere under ordinary pressure with increasing temperature from 50° C. to not lower than 330° C. at a temperature rise rate of 20° C./minute, and the increase rate of melt viscosity by addition of the reactive compound (c) is a ratio of a first melt viscosity after retention in a melt indexer at 315° C. for 5 minutes with addition of 0.5% by weight of the reactive compound (c) to the polyarylene sulfide (a) or the polyarylene sulfide (b) using [2-(3,4-epoxycyclohexyl)ethyl]trimethoxysilane as the reactive compound (c) to a second melt viscosity measured under conditions identical with those of measurement of the first melt viscosity without addition of reactive compound (c), and 3) the polyarylene sulfide (a) being obtained by heating a prepolymer (d), which includes a cyclic polyarylene sulfide expressed by Formula (A) and has a weight average molecular weight of less than 10,000, and having a weight average molecular weight of not less than 10,000:

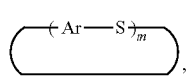
(A)

wherein,
in Formula (A), m denotes an integral number of 4 to 50 and Ar represents arylene group,
the cyclic polyarylene sulfide expressed by Formula (A) is a single cyclic polyarylene sulfide having a specific number m or a mixture of a plurality of cyclic polyarylene sulfides having different numbers m, 4) the polyarylene sulfide (b) has the weight reduction ratio ΔWr of not higher than 0.18% under heating and the increase rate of melt viscosity of not less than 1.05 times by addition of the reactive compound (c), 5) the polyarylene sulfide (b) being a polyarylene sulfide resin obtained by heating a mixture of a sulfide compound (e) having a reactive functional group expressed by Formula (B) added to the prepolymer (d) at a concentration of 0.1 mol % to 25 mol % relative to 1 mol of an arylene sulfide structural unit,

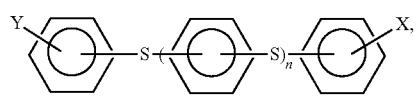
(B)

wherein
in Formula (B), at least one of Y and X represents a reactive functional group selected from the group consisting of amino group, carboxyl group, hydroxyl group, acid anhydride group, isocyanate group, epoxy group, silanol group, alkoxysilane group and their derivatives and n denotes an integral number of 0 to 20, and 6) the sulfide compound (e) is a single compound having a specific number n or a mixture of a plurality of compounds having different numbers n.

2. The method according to claim 1, wherein the melt-kneading step melt kneads not lower than 1 part by weight but not higher than 500 parts by weight of a fibrous and/or non-fibrous filler (f) added to the total content of the polyarylene sulfide (a) and the polyarylene sulfide (b) that is equal to 100 parts by weight.

3. The polyarylene sulfide resin composition obtained by the method according to claim 1.

4. The polyarylene sulfide resin composition according to claim 3, the polyarylene sulfide resin composition having the increase rate of melt viscosity by addition of the reactive compound (c) of not less than 1.05 times.

5. The polyarylene sulfide resin composition according to claim 3, the polyarylene sulfide resin composition having the weight reduction ratio expressed by the Equation (1) of not higher than 0.18%.

6. The polyarylene sulfide resin composition according to claim 3, wherein each of the polyarylene sulfide (a) and the polyarylene sulfide (b) has a polydispersity expressed by weight average molecular weight/number average molecular weight of not higher than 2.5.

7. The polyarylene sulfide resin composition according to claim 3, wherein the prepolymer (d) is a polyarylene sulfide prepolymer including at least not lower than 50% by weight of the cyclic polyarylene sulfide expressed by the General Formula (A) and having a weight average molecular weight of less than 10,000.

8. The polyarylene sulfide resin composition according to claim 3, wherein the polyarylene sulfide (b) includes a reactive functional group that is any one of amino group, carboxyl group and hydroxyl group, and a content of the reactive functional group in the polyarylene sulfide (b) is 0.01 to 5 mol % per 1 mol of an arylene sulfide structural unit.

9. The polyarylene sulfide resin composition according to claim 3, further comprising a fibrous and/or non-fibrous filler (f), wherein a content of the fibrous and/or non-fibrous filler (f) is not lower than 1 part by weight but not higher than 500 parts by weight relative to the total content of the polyarylene sulfide (a) and the polyarylene sulfide (b) that is equal to 100% by weight.

10. A molded product of the polyarylene sulfide resin composition according to claim 3.

* * * * *